July 17, 1934.   S. A. POLLOCK   1,966,644
ELECTRIC STORAGE CELL
Filed March 12, 1931     3 Sheets-Sheet 1

Inventor:
S. A. Pollock,
By Byrnes, Stebbins,
Parmelee & Blenko,
Attys.

July 17, 1934.  S. A. POLLOCK  1,966,644
ELECTRIC STORAGE CELL
Filed March 12, 1931   3 Sheets-Sheet 2
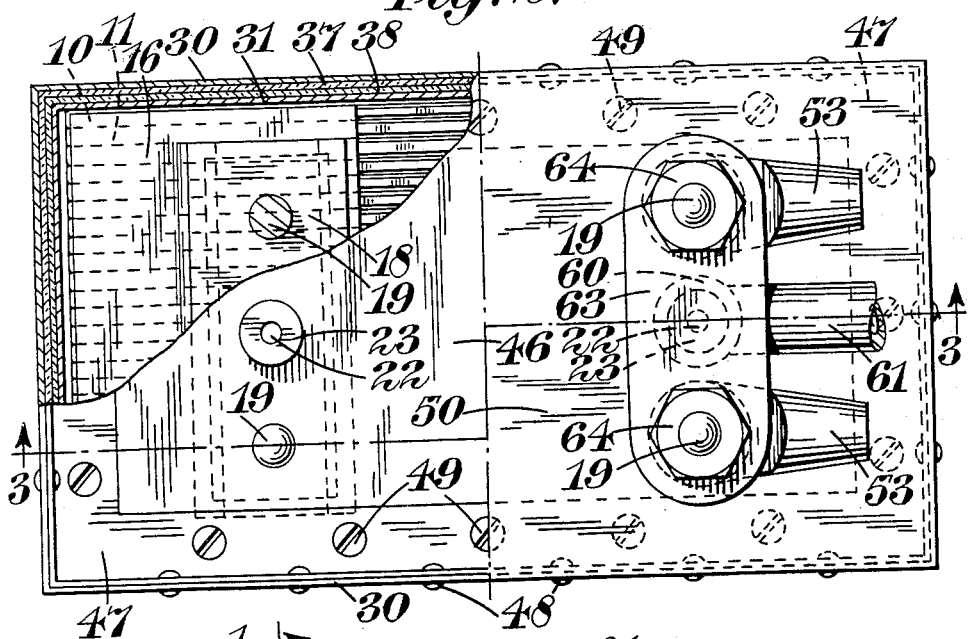
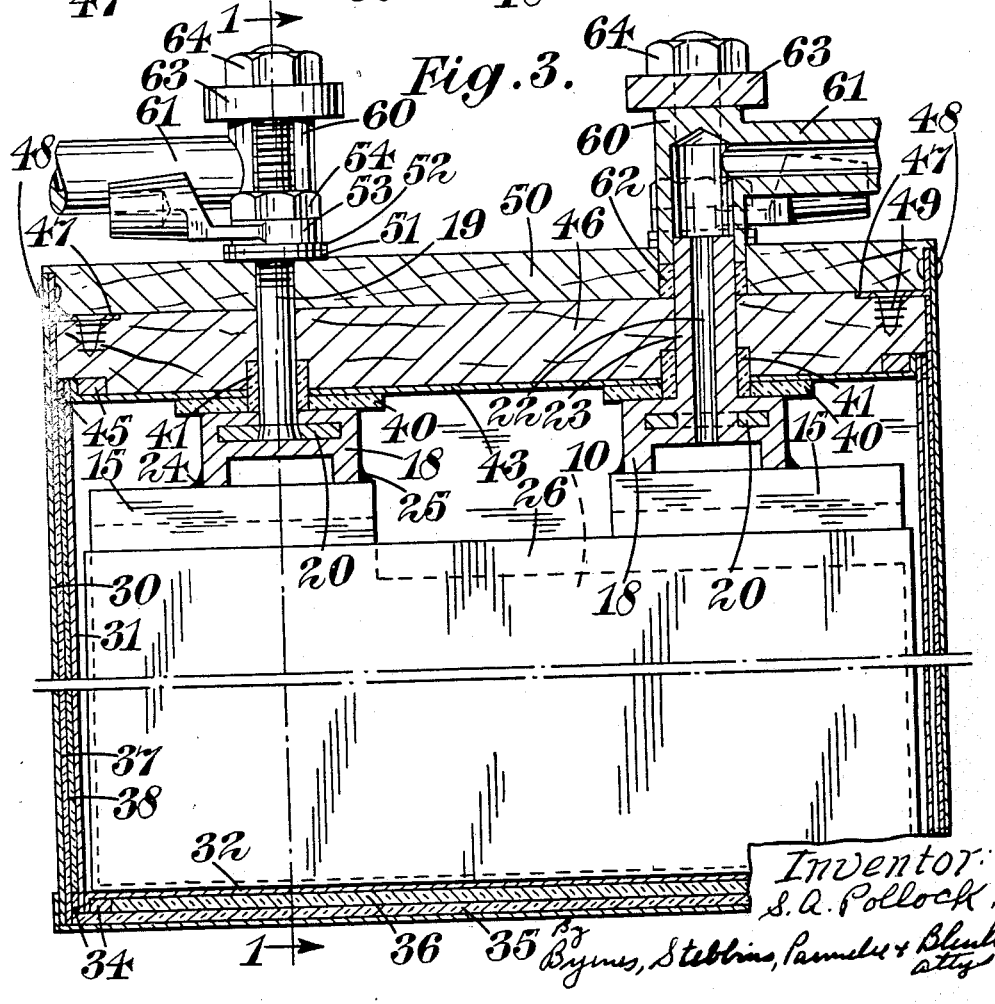

July 17, 1934.　　　　S. A. POLLOCK　　　　1,966,644
ELECTRIC STORAGE CELL
Filed March 12, 1931　　　3 Sheets-Sheet 3
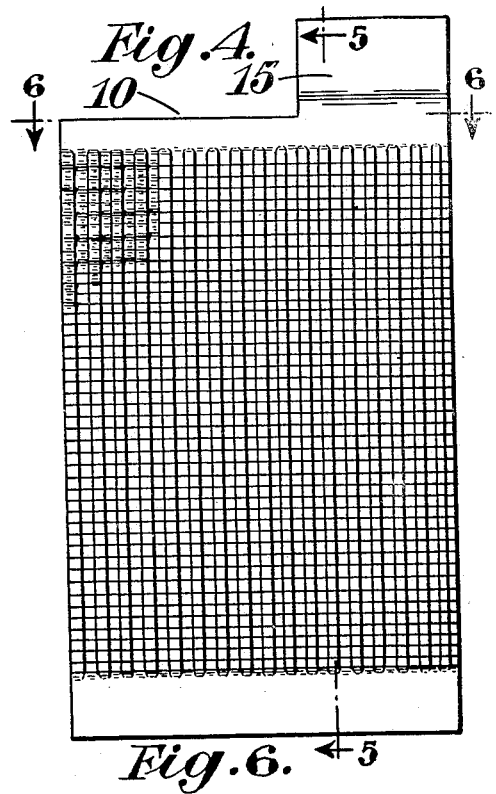
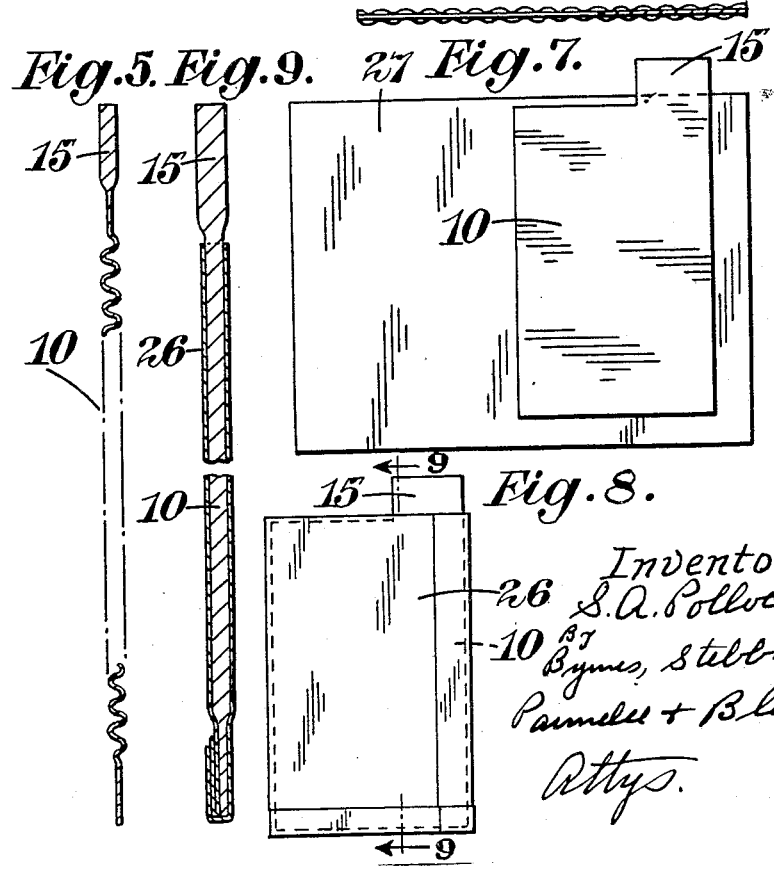

Patented July 17, 1934

1,966,644

UNITED STATES PATENT OFFICE

1,966,644

ELECTRIC STORAGE CELL

Samuel Alexander Pollock, London, England

Application March 12, 1931, Serial No. 522,132
In Great Britain March 18, 1930

8 Claims. (Cl. 136—6)

The present invention consists in improvements in or relating to electric storage cells and batteries, and in particular to an electric storage cell provided with an improved form of plate.

The present invention comprises an electric storage cell having a plate whereof a surface has projections and/or recesses formed on it, whereby when said surface is placed in contact with a flat surface (e.g. of a separator) channels are left between the surface and the plate to permit movement of the electrolyte from one part of the plate to another.

The invention also comprises an electric storage cell having a plate whereof a surface has projections and/or recesses formed on it of such depth that when the plate is placed between and in contact with two flat surfaces there will be sufficient electrolyte between said surfaces to react with the whole of the active material of the plate. Such an electric storage cell may have plates which are relatively thin, i. e. substantially not more than $\frac{1}{16}$ of an inch in thickness and the cell is then provided with a close fitting case surrounding the plates and separators and providing support for them.

The active material of the plates may be formed by chemical and/or electrochemical processes from sheet lead having its surfaces shaped to the desired configuration. The plates may be shaped from sheet metal by embossing.

A preferred method of forming plates for an electric storage cell, according to the invention, from sheet metal having its surfaces shaped to the desired configuration, consists of filling the cell with a solution containing ½ to 1% of potassium chlorate and approximately 10% of sulphuric acid in water and passing a current through the cell. After partially forming one set of plates the current is preferably reversed to partially form the other set. The current density may be between ¼ of an ampere and 1 ampere per square foot of plate surface.

In order that the invention may be more readily understood, a specific example thereof will now be described with reference to the accompanying drawings, in which:—

Figure 2 is a plan view of the storage cell showing certain portions broken away;

Figure 3 is a sectional elevation of the storage cell on the lines 3—3 of Figure 2;

Figure 4 is a face elevation of a plate;

Figure 5 is a sectional side elevation on the line 5—5 of Figure 4;

Figure 6 is a sectional plan on the line 6—6 of Figure 4;

Figures 7 and 8 are diagrams showing how a separating sheath is formed round a plate, and Figure 9 is a sectional side elevation of a plate showing the sheath in position and corresponds to a section on the line 9—9 of Figure 8.

Like reference numerals indicate like parts in all the figures.

Figure 1:
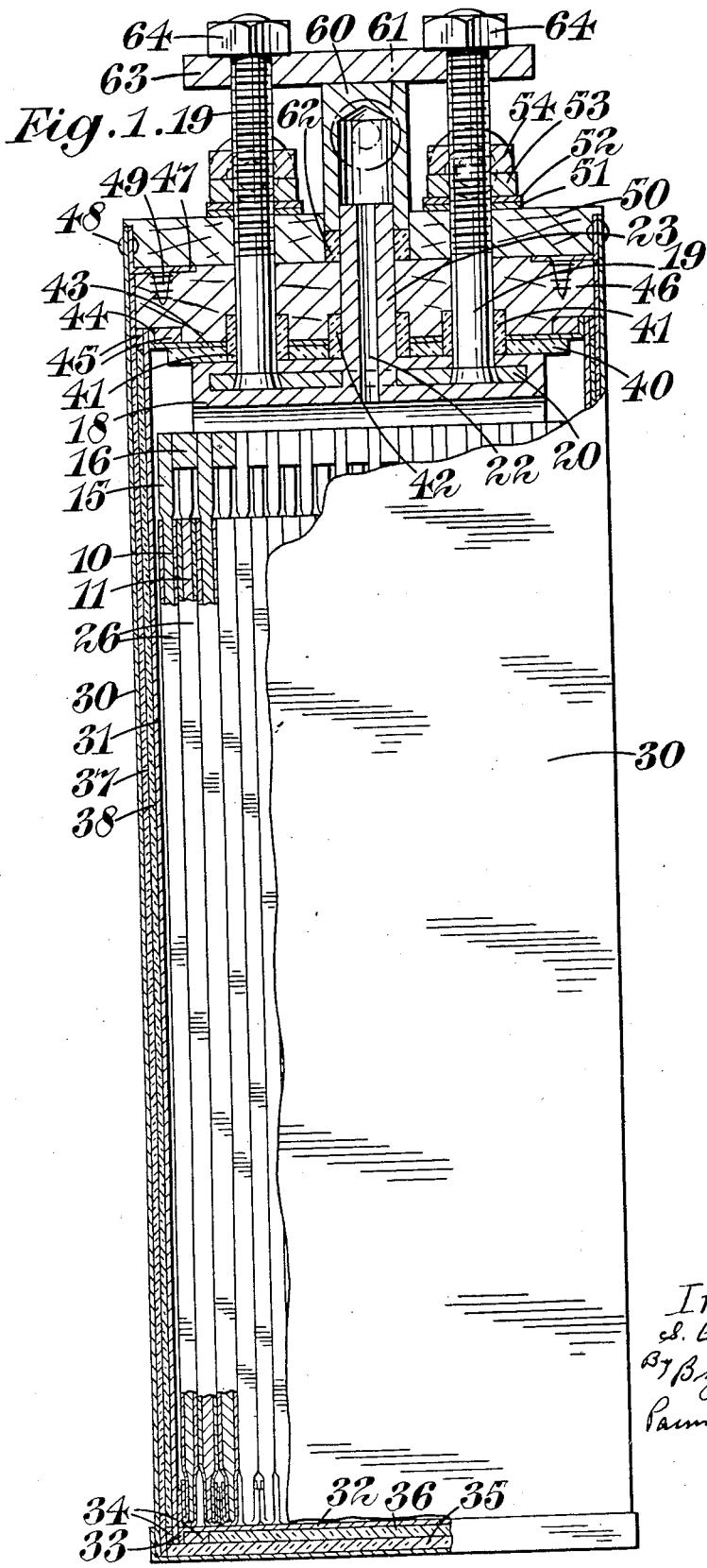
Figure 1 is a sectional elevation of an electric storage cell on the line 1—1 of Figure 3.

In the specific example of the invention shown a storage battery comprises an improved form of plate, an improved form of separator, an improved case and an improved venting system. The last three improvements constitute the subject-matter of my co-pending United States applications Serial Nos. 522,133, 604,854, 522,134 and 522,135.

As shown in Figure 1, the storage cell contains positive plates 10 and negative plates 11. These are constructed in exactly the same way as each other, and are only differentiated by their electrolytic formation.

The plates of the improved cell are considerably thinner than those of ordinary known cells and there are considerably more of them. The plates are formed from rolled sheet lead of high commercial purity and have their surfaces embossed, grooved or corrugated in order to provide space for the electrolyte and channels for its unimpeded circulation from one part of the plate to another between the plates and separators.

Figures 4 to 6 show a plate with a preferred form of embossing.

The preferred form of plate is corrugated all over by rolling. This corrugation may be effected in two directions inclined (e. g. perpendicular) to one another, that is to say, by forming wave-like corrugations and thereafter indenting the ridges of these corrugations along lines substantially inclined to the ridges, whereby the electrolyte can circulate freely in two directions inclined e. g. at right angles to one another. This may be done by passing a plate between a pair of ribbed rollers to form corrugations and thereafter passing it between different rollers, or the same rollers set further apart, so as to indent the ridges of the corrugations first formed. It will be found that if a plate is corrugated in two directions at right angles, channels for the passage of the electrolyte will also be provided in diagonal directions equally inclined to the directions of corrugation. A very complete circulation of electrolyte is, therefore, provided.

The plates may be perforated either before, after or at the same time as they are embossed or corrugated. This may be conveniently and cheaply carried out before corrugating by means of a pair of rollers one of which has sharp pin points or other piercing elements projecting from it and the other of which has grooves or recesses to accommodate but not fit the piercing elements. Alternatively, a perforating machine may be used. Perforation has the advantage that the active material is formed on one side of the plate so as to be continuous with active material formed on the other side and thereby adheres more firmly to the plate.

The plates are constructed with connecting tags 15 which are of greater thickness than the remainder of the plate.

The plates of each set (e. g. all the negative plates of a cell) are jointed together by interleaving their tags 15 with lead strips 16 and fusing together by running a blow-pipe along the top. Each set of plates is similarly secured to a bus-bar 18.

The bus-bar comprises a pair of terminal bolts 19 bridged by a bronze strap 20 provided with a hole 21. Round the strap 20 is moulded the bus-bar 18 consisting of lead antimony alloy. The bus-bar is of channel section and has a small hole 22 in its middle concentric with the hole 21 in the bronze strap and a tubular projection 23 projecting upwardly and forming a continuation of the hole 22. The bus-bar is connected to a set of plates by fusing along its edges with a blow-pipe as shown at 24 and 25.

The separators in this form of the invention for interleaving between the plates when the latter are held in a tightly fitting case consist of sheaths 26 of porous insulating acid-proof material such as nitrated cellulose paper which fit over the plates and are closed along both sides and at the bottom.

Figures 7 to 9 show the formation of the separating sheath. After the paper has been nitrated, a sheet 27 of it is placed as shown in Figure 7 and folded over at both edges and at the bottom of the plate so as to form a closed sheath as shown in Figures 8 and 9. This operation is performed while the paper is wet, and it is not found necessary to employ an adhesive to keep the sheath in shape.

In actual assembly a set of plates, say the positive set is turned upside down and a sheath is formed, as described, and fitted over each plate. The two sets of plates, each with its sheaths are then brought together so that they are interleaved, i. e. so that each pair of neighboring plates of one set is separated by a plate of the other set. The plates are then inserted in their tightly fitting case.

The storage cell comprises two cases, an outer steel case 30 to provide mechanical support for the contents and an inner case 31 of lead to form a sealed vessel to contain the electrolyte. The cases are left open on one side (the top) through which the plates are inserted.

In order to form the lead case, a sheet of comparatively thin lead is taken and bent to the form of a rectangular tube over a former such as a block of wood. The adjacent edges of the sheet are then flanged so that the two flanges lie flat against each other and project outwardly from the surface of that side of the case. A thin fillet of lead is then placed in the angle of each flange so as to lie flat against the flange and against the side of the case. A blow-pipe is then run along the outer surfaces of the fillets and flanges and serves to fuse the edges of the flanges and fillets together.

A similar method is adopted for securing the bottom 32 of the lead case to its side walls. For this purpose the bottom 32 is provided all round with a flange 33. The bottom is then fitted into the rectangular tube constituting the side walls, and a fillet consisting of a strip of lead 34 is placed inside and outside each edge of the bottom. A blow-pipe is then run along these edges and fuses them together.

It is found that by providing these fillets a better joint is obtained since if they are not provided, the flanges tend to fuse on their outer sides rather than at the surface where they are in contact with one another and where the joint is required.

The plates are then inserted in the lead case. At this stage the plates are a close but not a tight fit in the case. When, however, they have been electrically formed they fit tightly into the case (which is then enclosed in the outer steel case) so as to form a tight pack supported by the sides of the case.

On the top of each bus-bar there is placed a flat rubber packing washer 40 of rectangular shape with holes for the passage of the terminal bolts 19 and the projection 23, and sleeves 41 and 42, also of rubber, are provided surrounding the terminal bolts 19 and projection 23 respectively. These serve as packing and also to insulate the bus-bar from the top of the lead case. The lead top 43 is formed similarly to the bottom but with holes for the sleeves 41 and 42 and is secured in position by forming a flange 44 round the edge, gripping it with the margin of the side walls, between fillets 45 and fusing along the upper edge. The lead case is inserted in the steel case with the interposition of insulating packing. This may take the form of impregnated cardboard sheets 35 and 36 at the bottom and 37 and 38 round the sides.

An inner top 46 of wood is now placed over the lead top and serves to protect the latter and support it against internal pressure. It is provided with holes for the passage of the bolts 19 and the projections 23, and with recesses for the edges of the lead case and for the sleeves 41 and 42. It is secured in position by means of a bronze beading 47 of angle section secured to the outer steel case by rivets 48 and to the wooden top 46 by screws 49.

An outer wooden top 50 which projects above the upper edge of the steel case and has holes for the passage of the terminal bolts and holes for the projections 23 of greater diameter than the latter is now placed in position. Each terminal bolt 19 is provided with a rubber washer 51, a brass washer 52, an electrical connecting tag 53, for external and inter-cell connections, and a nut 54. The nuts 54 through the connecting tags and the washers 51 and 52 serve to hold the lid 50 in position, and also serve to ensure a tight joint between the packing 40 and the lead top.

Each vent pipe consists of a tubular boss 60 closed at one end, and having a branch pipe 61 extending laterally from it and communicating at its opposite end with a similar boss 60 connected to a neighbouring cell. The external and internal diameters of the tubular boss 60 are such that it fits into the hole in the top 50 and fits over the upper end of the tubular venting projection 23. A packing sleeve 62 of rubber is inserted in the hole in the top 50 surrounding the projection 23. A bridge 63 extends between the terminal bolts 19 on top of the tubular boss 60 and is clamped down by means of nuts 64 on the terminal bolts. It will be appreciated that as these nuts are tightened, the packing sleeve 62 is compressed in a vertical direction and consequently expands radially outwards and inwards against the top 50 and projection 23 respectively. In this way a tight joint between the projection 23 and the tubular boss 60 is obtained without any direct downward pressure on the projection 23 which might otherwise tend to loosen the packing 40. It will be appreciated that in the construction described all the glands are mechanically tightened and there is no tendency when tightening one to loosen another.

In an alternative construction the plates are formed with tags for connection, which are bent so as to lie flat against one another and of which the ends are then secured (e.g. fused) together to form a solid joint. If the cell is intended for stationary use the tags may be fused at the same time to comparatively substantial lead strips which will serve for interconnection of cells. The tags may be made of greater thickness than the remainder of the plate, e. g, by differential rolling, to prevent weakness after formation. Alternatively, or in addition, they may be coated with an insulating acid-proof dope to prevent the formation of active material on them while the plates are being formed.

An important feature of the storage cell described is that thin plates can be successfully employed and it is therefore possible to obtain a large area of plate surface by employing a large number of plates. In the lead sulphuric acid cell in good condition in the discharged state the active material of the plates consists largely of lead sulphate associated in a particular manner with other materials, such as lead peroxide, on the positive plate, and sponge lead, on the negative plate. The result of charging such a cell is to convert the lead sulphate by combination of some of the water content in the electrolyte into additional lead peroxide on the positive plate, additional sponge lead on the negative plate, and additional sulphuric acid in the electrolyte. The conversion of lead sulphate to sponge lead on the negative electrode does not take place directly, since the lead sulphate must first pass through the stage of solution in the electrolyte to form lead ions which can then be deposited by the electric energy supplied to the cell in the form of sponge lead active material. The supply of lead ions to the electrolyte is limited both by the surface of the lead sulphate in contact with the electrolyte and by the very slight solubility of lead sulphate in the electrolyte. If the supply of lead ions at the negative electrode fails to keep pace with the demand of the charging current as may readily happen at high current density, the voltage of the cell rises to a value which causes the discharge of hydrogen ions against the negative electrode. As these hydrogen ions do not contribute to storage of energy both current and voltage are wasted and the efficiency of the cell is lowered. The solubility of lead sulphate in the electrolyte is extremely small when tested by ordinary chemical methods, and although the solubility is increased by rapid removal of the ions in the solution by the charging current, the rate of solution of lead sulphate under a given charging current becomes a controlling factor in determining the efficiency of the cell. When the rate of solution is inadequate, the only practicable method of increasing the rate and, therefore, the power efficiency of the cell is to increase the exposed surface of the electrodes. In this invention the surface of the electrodes is purposely increased as much as possible in order to promote a high rate of solubility of the lead sulphate whilst providing means for securing adequate mechanical strength by special methods of construction.

In the lead-sulphuric acid type of storage cell, I have found that for a given quantity or weight of active material relatively thin films of such material, when uniformly distributed over the surfaces of the lead plates, furnish the highest electric energy conversion efficiency of any known construction or arrangement of such active material. Another advantage I have found by arranging the active material in relatively thin films uniformly covering the underlying solid lead of the electrodes, is comparative freedom from the well-known defect of pernicious sulphation.

In order to carry out in a practical manner the distribution of active material in relatively thin films without adding undue weight, it is necessary to employ suitably thin metallic plates as a conducting foundation for the active material. Such plates would, in general, need supplementary support to withstand violent movement or mechanical shock. Such support is provided in the construction being described by inserting the plates in sheaths, packing them tightly together, and fitting them tightly in a strong case. The sheaths perform the function of separators in an ordinary cell and the combination of plates, sheaths and case can obviously be given any degree of strength or resistance to deformation which may be required by assembling the plates and sheaths tightly in the case. In such an assembly I provide adequate space for the necessary quantity of electrolyte within each sheath in the spaces and channels provided on the plates for the circulation of the electrolyte as already described without depending to any substantial extent upon the diffusion through the separators or the overlapping folds of the separators. The whole group of plates sheathed as described are allowed to rest on the bottom of the containing case without the possibility of a conducting bridge of sediment dislodged from active material being formed between the negative and positive groups of plates which could cause short-circuit between the groups.

In accordance with the invention the plates after being fused to the terminal blocks, inserted in their sheaths and assembled in their cases have their surfaces formed into active material by the following process—

I have discovered in connection with this invention that many known forming solutions are entirely unsuitable for producing satisfactory films of peroxide on the surface of sheet lead owing to insufficient adherence, irregular corrosion, irregular conversion of the intermediate lead salt to peroxide, the sealing up of the surface with lead sulphate, or some other defect. I have found that a forming solution containing ½ to 1 per cent. of potassium chlorate and 10 per cent. of sulphuric acid in water gives a consistently satisfactory and controllable result under the conditions hereinafter described. The procedure which I prefer is to fill the cells with a sulphuric acid solution in water of 1.074 specific gravity as a first stage in the process and pass an electric current through the cells from an external source of such a strength as to provide a current density of approximately ¼ of an ampere per square foot of plate surface of one group of plates, i. e. either a positive or negative group, for about 15 minutes with reversal of the current every 15 minutes until the current has been flowing for an hour. This preliminary treatment cleans the plates electrolytically and ensures a uniform start of the formation process. The weak sulphuric acid solution is then withdrawn from the cells and replaced by the special forming solution hereinbefore mentioned. An electric current of approximately the same density is again established through the cells as before which has the effect of converting the surfaces of the group of plates functioning as anodes into peroxide of lead. The formation is allowed to proceed until a predetermined amount of lead from the anodes is converted into peroxide. The most favourable current density to use I find depends upon the concentration of potassium chlorate in the forming solution and as this salt is slowly exhausted by the current, it is necessary for obtaining a uniform result to analyze the solution periodically, for example, after every 50 hours' use and restore the solution to its original strength by the addition of potassium chlorate. For a solution containing ½ to 1 per cent. of potassium chlorate, I find that a current density of ¼ of an ampere per square foot of surface is suitable and for a solution containing 1 per cent. of the same salt a current density of ½ of an ampere per square foot is suitable. As a general guide I find that these proportions can be advantageously followed up to the higher limit of 1.8 per cent. of chlorate of potassium in the forming solution.

After the first group of plates have functioned as anodes in the formation process sufficiently long to acquire a sufficiently thick or heavy coat of peroxide, which usually requires from 50 to 100 hours, the current is reversed and for the first few hours is increased to about double its ordinary density with the object of arresting the formation of sulphate on the plates, which have then become cathodic, and the formation afterwards continued at the normal current density.

This procedure has the effect of forming the surfaces of both groups of plates with an active coat of lead peroxide with probably a certain amount of lead chloride on the group of plates last made cathodic. The forming solution is now replaced in the cells with plain sulphuric acid solution of 1.074 specific gravity and the electric current is re-established in the same direction as before for the purpose of reducing the active material on the group of plates last made cathodic to sponge lead and, therefore, that group of plates into the ordinary negative element of the cell.

The cells so formed may be washed with water until entirely free from traces of chlorine and subsequently charged and treated like ordinary storage cells.

I claim:—

1. An electric storage cell having a plate made of sheet lead which is given a contour such as would result from passing the plain sheet from which the plate is made between a pair of ribbed rollers having ribs of smoothly curved section on the surface of the rollers parallel with the axis of rotation and subsequently passing the corrugated sheet so formed at a substantial angle to the first direction again through similar rollers set further apart so as to indent the ridges of the first corrugations made.

2. An electric storage cell having plates made of sheet lead which is given a contour such as would result from imparting to the plate wavelike corrugations and thereafter indenting the ridges so formed along lines at a substantial angle to the ridges, and flat separators interleaved with the plates and in contact with the active material thereof, the projections and recesses on the plates being of such shape and depth that there will be sufficient electrolyte between the two separators in contact with the plate to react with the whole of the active material thereof.

3. An electric storage cell having a plate which is given a contour such as would result from passing the plain sheet from which the plate is made between a pair of ribbed rollers having ribs of smoothly curved section on the surface of the rollers parallel with the axis of rotation and subsequently passing the corrugated sheet so formed at a substantial angle to the ridges, the indentations of the ridges being of less than half the depth of the original corrugations.

4. An electric storage cell having a plate made of sheet lead of not substantially more than $\tfrac{1}{16}$ of an inch in thickness which is given a contour such as would result from passing the plain sheet from which the plate is made between a pair of ribbed rollers having ribs of smoothly curved section on the surface of the rollers parallel with the axis of rotation and subsequently passing the corrugated sheet so formed at a substantial angle to the first direction again through similar rollers set further apart so as to indent the ridges of the first corrugations made.

5. An electric storage cell comprising plates which are formed of sheet lead of not substantially more than $\tfrac{1}{16}$ of an inch in thickness, which are given a contour such as would result from imparting to the sheet lead wavelike corrugations and thereafter indenting the ridges thereof along lines at a substantial angle to the ridges, flat separators interleaved with the plates, the projections and recesses on the plates being of such shape and depth that there will be sufficient electrolyte between the two separators in contact with the plate to react with the whole of the active material thereof, and a close fitting case surrounding the plates and separators and providing support for them.

6. An electric storage cell having a plate made of sheet lead which is cut so as to provide a lug integral with the remainder of the plate for electrical connection to bus-bars and which is given a contour such as would result from passing the plain sheet from which the plate is made between a pair of ribbed rollers having ribs of smoothly curved section on the surface of the rollers parallel with the axis of rotation and subsequently passing the corrugated sheet so formed at a substantial angle to the first direction again through similar rollers set further apart so as to indent the ridges of the first corrugations made.

7. An electric storage cell having a plate made of sheet lead which is cut so as to provide a lug integral with the remainder of the plate for electrical connection to bus-bars and which is given a contour such as would result from passing the plain sheet from which the plate is made between a pair of ribbed or grooved rollers having ribs or grooves of smoothly curved section on the surface of the rollers parallel with the axis of rotation and subsequently passing the corrugated sheet so formed at a substantial angle to the first direction again through similar rollers set further apart so as to indent the ridges of the first corrugations made, spacing strips of lead inserted between the lugs of adjacent plates of a set, the joints between the strips and the lugs being secured by fusion.

8. An electric storage cell having a plate made of sheet lead which is cut so as to provide a lug integral with the remainder of the plate for electrical connection to bus-bars and of greater thickness than the remainder of the plate and which is given a contour such as would result from passing the plain sheet from which the plate is made between a pair of ribbed rollers having ribs of smoothly curved section on the surface of the rollers parallel with the axis of rotation and subsequently passing the corrugated sheet so formed at a substantial angle to the first direction again through similar rollers set further apart so as to indent the ridges of the first corrugations made.

SAMUEL ALEXANDER POLLOCK.